(12) United States Patent
Lanner et al.

(10) Patent No.: US 10,779,601 B2
(45) Date of Patent: Sep. 22, 2020

(54) HELMET, LINER FOR A HELMET, COMFORT PADDING FOR A HELMET AND CONNECTOR

(71) Applicant: MIPS AB, Täby (SE)

(72) Inventors: Daniel Lanner, Täby (SE); Marcus Seyffarth, Täby (SE); Amy Louise Pomering, Täby (SE)

(73) Assignee: MIPS AB (SE)

( * ) Notice: Subject to any disclaimer, the term of this patent is extended or adjusted under 35 U.S.C. 154(b) by 268 days.

(21) Appl. No.: 15/745,308

(22) PCT Filed: Mar. 9, 2017

(86) PCT No.: PCT/EP2017/055591
§ 371 (c)(1),
(2) Date: Jan. 16, 2018

(87) PCT Pub. No.: WO2017/157765
PCT Pub. Date: Sep. 21, 2017

(65) Prior Publication Data
US 2018/0213874 A1    Aug. 2, 2018

(30) Foreign Application Priority Data

Mar. 17, 2016  (GB) .................................. 1604558.5
Nov. 17, 2016  (GB) .................................. 1619466.4

(51) Int. Cl.
*A42B 3/06* (2006.01)
*A42B 3/12* (2006.01)
*B32B 7/08* (2019.01)

(52) U.S. Cl.
CPC .............. *A42B 3/064* (2013.01); *A42B 3/127* (2013.01); *B32B 7/08* (2013.01); *B32B 2255/00* (2013.01); *B32B 2437/04* (2013.01)

(58) Field of Classification Search
CPC ............ A42B 3/064; A42B 3/127; B32B 7/08
(Continued)

(56) References Cited

U.S. PATENT DOCUMENTS 8,931,606 B2    1/2015  Hawkins et al.
2006/0242752 A1  11/2006  Talluri
(Continued)

FOREIGN PATENT DOCUMENTS

CN          1913796     2/2007
CN        201315883     9/2009
(Continued)

OTHER PUBLICATIONS

International Search Report and Written Opinion for PCT/EP2017/055591 dated May 30, 2017, 14 pages.
(Continued)

*Primary Examiner* — Gloria M Hale
(74) *Attorney, Agent, or Firm* — Perkins Coie LLP (57) ABSTRACT

A connector (20) for connecting first (14) and second (15) parts of an apparatus (1), comprising: a sliding plate (21); an anchor point (22) on one side of the plate, configured to be connected to the first part; and a deformable material, configured to at least partially cover the side of the plate on which the anchor point is located; wherein a peripheral region (23) of the deformable material is configured to be connected to the second part and an inner region of the deformable material is connected to at least one of the plate and the anchor point; the connector further comprising a layer of material (25, 30) that is located on the opposite side of the plate from the anchor point; wherein a low friction interface is provided between the opposing surfaces of the plate and the layer of material.

30 Claims, 6 Drawing Sheets

(58) Field of Classification Search
USPC .......................................................... 2/412
See application file for complete search history.

(56) References Cited

U.S. PATENT DOCUMENTS

2015/0047109 A1    2/2015  Grant et al.
2018/0213874 A1*   8/2018  Lanner ................. A42B 3/064

FOREIGN PATENT DOCUMENTS

| CN | 102811639 | 12/2012 |
|----|-----------|---------|
| CN | 103564936 | 2/2014 |
| CN | 103635112 | 3/2014 |
| CN | 104219975 | 12/2014 |
| CN | 104244754 | 12/2014 |
| CN | 104427896 | 3/2015 |
| CN | 105324048 | 2/2016 |
| SE | 9802228 | 3/2001 |
| SE | 0004160 | 9/2002 |
| WO | 2011139224 A1 | 11/2011 |
| WO | 2015177747 A1 | 11/2015 |

OTHER PUBLICATIONS

Peijun Zhang; "Types, Characteristics of Safety Helmet of Motorcycle and Its Maintenance," Motorcycle Technology, pp. 68-70 (publication date: Sep. 30, 2016) (with English machine translation).

\* cited by examiner

HELMET, LINER FOR A HELMET, COMFORT PADDING FOR A HELMET AND CONNECTOR

RELATED APPLICATIONS

This application is a 35 USC § 371 National Stage application of International Application No. PCT/EP2017/055591, entitled "HELMET, LINER FOR A HELMET, COMFORT PADDING FOR A HELMET AND CONNECTOR," filed on Mar. 9, 2017, which claims priority to Great Britain Application No. 1604558.5, filed Mar. 17, 2016, and Great Britain Application No. 1619466.4, filed Nov. 17, 2016, the contents of which are incorporated by reference herein in their entireties.

The present invention relates to helmets, liners for helmets, comfort padding for helmets and connectors that may be used to connect two parts of an apparatus, for example for connecting a liner to the remainder of a helmet.

Helmets are known for use in various activities. These activities include combat and industrial purposes, such as protective helmets for soldiers and hard-hats or helmets used by builders, mine-workers, or operators of industrial machinery for example. Helmets are also common in sporting activities. For example, protective helmets may be used in ice hockey, cycling, motorcycling, motor-car racing, skiing, snow-boarding, skating, skateboarding, equestrian activities, American football, baseball, rugby, cricket, lacrosse, climbing, golf, airsoft and paintballing.

Helmets can be of fixed size or adjustable, to fit different sizes and shapes of head. In some types of helmet, e.g. commonly in ice-hockey helmets, the adjustability can be provided by moving parts of the helmet to change the outer and inner dimensions of the helmet. This can be achieved by having a helmet with two or more parts which can move with respect to each other. In other cases, e.g. commonly in cycling helmets, the helmet is provided with an attachment device for fixing the helmet to the user's head, and it is the attachment device that can vary in dimension to fit the user's head whilst the main body or shell of the helmet remains the same size. Such attachment devices for seating the helmet on a user's head may be used together with additional strapping (such as a chin strap) to further secure the helmet in place. Combinations of these adjustment mechanisms are also possible.

Helmets are often made of an outer shell, that is usually hard and made of a plastic or a composite material, and an energy absorbing layer called a liner. Nowadays, a protective helmet has to be designed so as to satisfy certain legal requirements which relate to inter alia the maximum acceleration that may occur in the centre of gravity of the brain at a specified load. Typically, tests are performed, in which what is known as a dummy skull equipped with a helmet is subjected to a radial blow towards the head. This has resulted in modern helmets having good energy-absorption capacity in the case of blows radially against the skull. Progress has also been made (e.g. WO 2001/045526 and WO 2011/139224, which are both incorporated herein by reference, in their entireties) in developing helmets to lessen the energy transmitted from oblique blows (i.e. which combine both tangential and radial components), by absorbing or dissipating rotation energy and/or redirecting it into translational energy rather than rotational energy.

Such oblique impacts (in the absence of protection) result in both translational acceleration and angular acceleration of the brain. Angular acceleration causes the brain to rotate within the skull creating injuries on bodily elements connecting the brain to the skull and also to the brain itself.

Examples of rotational injuries include Mild Traumatic Brain Injuries (MTBI) such as concussion, and Severe Traumatic Brain Injuries (STBI) such as subdural haematomas (SDH), bleeding as a consequence of blood vessels rapturing, and diffuse axonal injuries (DAI), which can be summarized as nerve fibres being over stretched as a consequence of high shear deformations in the brain tissue.

Depending on the characteristics of the rotational force, such as the duration, amplitude and rate of increase, either concussion, SDH, DAI or a combination of these injuries can be suffered. Generally speaking, SDH occur in the case of accelerations of short duration and great amplitude, while DAI occur in the case of longer and more widespread acceleration loads.

In helmets such as those disclosed in WO 2001/045526 and WO 2011/139224 that may reduce the rotational energy transmitted to the brain caused by oblique impacts, the first and second parts of the helmet may be configured to slide relative to each other following an oblique impact. However, it remains desirable for the first and second parts to be connected such that the helmet retains its integrity during normal use, namely when not subject to an impact. It is therefore desirable to provide connectors that, whilst connecting first and second parts of a helmet together, permit movement of the first part relative to the second part under an impact. It is also desirable to provide connectors within a helmet that can be provided without substantially increasing the manufacturing costs and/or effort. The present invention aims to at least partially address this problem.

According to an aspect of the present invention, there is provided a connector for connecting first and second parts of an apparatus comprising:

a sliding plate;

an anchor point on one side of the plate, configured to be connected to the first part; and a deformable material, configured to at least partially cover the side of the plate on which the anchor point is located;

wherein a peripheral region of the deformable material is configured to be connected to the second part and an inner region of the deformable material is connected to at least one of the plate and the anchor point;

the connector further comprising a layer of material that is located on the opposite side for the plate from the anchor point;

wherein a low friction interface is provided between the opposing surfaces of the plate and the layer of material.

Depending on the configuration, the peripheral region of the deformable material may be directly or indirectly connected to the second part.

The anchor point may be connected to the first part in a manner that prevents translational movement of the anchor point relative to the second part. Similarly, the deformable material may be connected to the second part, directly or indirectly, in a manner that prevents translational movement of the section of the deformable material that is connected to the second part relative to the second part. However, because the first and second parts of the apparatus are connected by way of the deformable material, translational movement, such as sliding, of the first part relative to the second part may be provided.

According to an aspect of the present invention, there is provided a liner for a helmet comprising at least one connector as described above. The liner may be connected to the remainder of the helmet by way of the at least one connector in order to permit translational movement of the liner relative to the remainder of the helmet. Accordingly, sliding movement of the liner relative to the remainder of the helmet may be provided.

According to the present invention, there is provided a helmet incorporating a liner as described above. The liner may be removable. For example, the at least one connector may be configured such that it can be detachably connected to at least one of the liner and the remainder of the helmet.

According to an aspect of the present invention, the helmet may comprise in turn, an outer shell formed from a relatively hard material, one or more layers of energy absorbing material, an inner shell formed from a relatively hard material, and a liner as described above.

According to an aspect of the present invention, there is provided a helmet, comprising a plurality of independent sections of comfort padding, each mounted to the helmet by at least one connector as described above. The invention is described below by way of non-limiting examples, with reference to the accompanying drawings, in which:

The proportions of the thicknesses of the various layers in the helmets depicted in the figures have been exaggerated in the drawings for the sake of clarity and can of course be adapted according to need and requirements.

Figure 1:
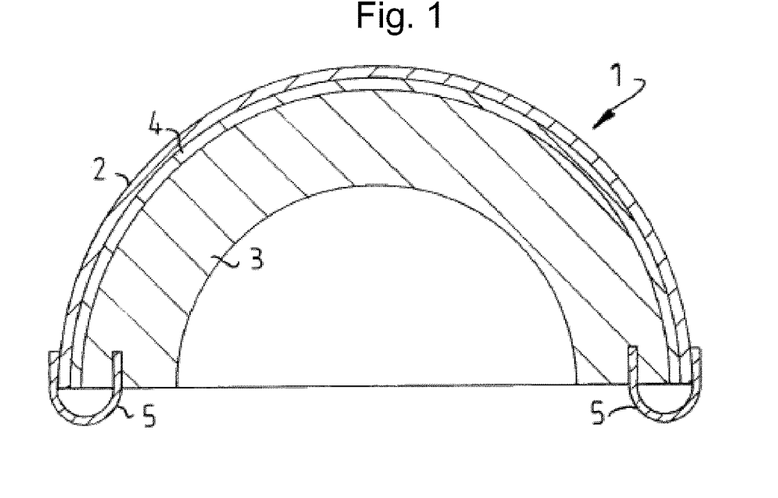
FIG. 1 depicts a cross-section through a helmet for providing protection against oblique impacts.

FIG. 1 depicts a first helmet 1 of the sort discussed in WO 01/45526, intended for providing protection against oblique impacts. This type of helmet could be any of the types of helmet discussed above.

Protective helmet 1 is constructed with an outer shell 2 and, arranged inside the outer shell 2, an inner shell 3 that is intended for contact with the head of the wearer.

Arranged between the outer shell 2 and the inner shell 3 is a sliding layer 4 or a sliding facilitator, and thus makes possible displacement between the outer shell 2 and the inner shell 3. In particular, as discussed below, a sliding layer 4 or sliding facilitator may be configured such that sliding may occur between two parts during an impact. For example, it may be configured to enable sliding under forces associated with an impact on the helmet 1 that is expected to be survivable for the wearer of the helmet 1. In some arrangements, it may be desirable to configure the sliding layer or sliding facilitator such that the coefficient of friction is between 0.001 and 0.3 and/or below 0.15.

Arranged in the edge portion of the helmet 1, in the FIG. 1 depiction, may be one or more connecting members 5 which interconnect the outer shell 2 and the inner shell 3. In some arrangements, the connectors may counteract mutual displacement between the outer shell 2 and the inner shell 3 by absorbing energy. However, this is not essential. Further, even where this feature is present, the amount of energy absorbed is usually minimal in comparison to the energy absorbed by the inner shell 3 during an impact. In other arrangements, connecting members 5 may not be present at all.

Further, the location of these connecting members 5 can be varied (for example, being positioned away from the edge portion, and connecting the outer shell 2 and the inner shell 3 through the sliding layer 4).

The outer shell 2 is preferably relatively thin and strong so as to withstand impact of various types. The outer shell 2 could be made of a polymer material such as polycarbonate (PC), polyvinylchloride (PVC) or acrylonitrile butadiene styrene (ABS) for example. Advantageously, the polymer material can be fibre-reinforced, using materials such as glass-fibre, Aramid, Twaron, carbon-fibre or Kevlar.

The inner shell 3 is considerably thicker and acts as an energy absorbing layer. As such, it is capable of damping or absorbing impacts against the head. It can advantageously be made of foam material like expanded polystyrene (EPS), expanded polypropylene (EPP), expanded polyurethane (EPU), vinyl nitrile foam; or other materials forming a honeycomb-like structure, for example; or strain rate sensitive foams such as marketed under the brand-names Poron™ and D3O™. The construction can be varied in different ways, which emerge below, with, for example, a number of layers of different materials.

Inner shell 3 is designed for absorbing the energy of an impact. Other elements of the helmet 1 will absorb that energy to a limited extend (e.g. the hard outer shell 2 or so-called 'comfort padding' provided within the inner shell 3), but that is not their primary purpose and their contribution to the energy absorption is minimal compared to the energy absorption of the inner shell 3. Indeed, although some other elements such as comfort padding may be made of 'compressible' materials, and as such considered as 'energy absorbing' in other contexts, it is well recognised in the field of helmets that compressible materials are not necessarily 'energy absorbing' in the sense of absorbing a meaningful amount of energy during an impact, for the purposes of reducing the harm to the wearer of the helmet.

A number of different materials and embodiments can be used as the sliding layer 4 or sliding facilitator, for example oil, Teflon, microspheres, air, rubber, polycarbonate (PC), a fabric material such as felt, etc. Such a layer may have a thickness of roughly 0.1-5 mm, but other thicknesses can also be used, depending on the material selected and the performance desired. The number of sliding layers and their positioning can also be varied, and an example of this is discussed below (with reference to FIG. 3B).

As connecting members 5, use can be made of, for example, deformable strips of plastic or metal which are anchored in the outer shell and the inner shell in a suitable manner.

Figure 2:
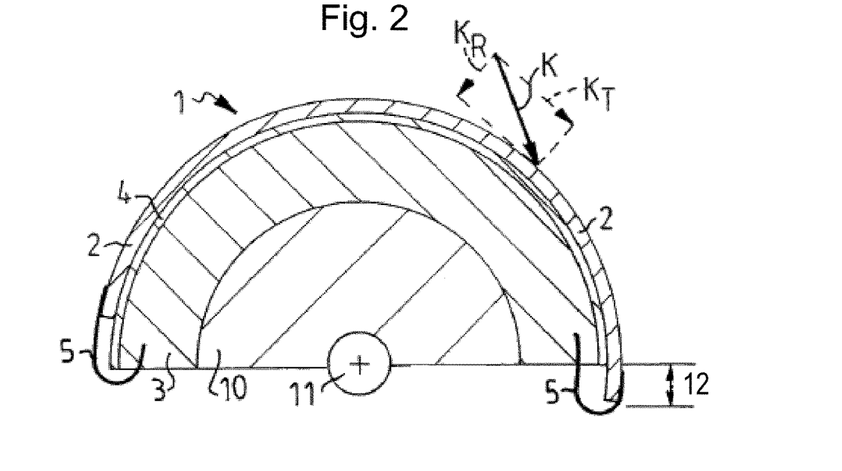
FIG. 2 is a diagram showing the functioning principle of the helmet of FIG. 1.

FIG. 2 shows the functioning principle of protective helmet 1, in which the helmet 1 and a skull 10 of a wearer are assumed to be semi-cylindrical, with the skull 10 being mounted on a longitudinal axis 11. Torsional force and torque are transmitted to the skull 10 when the helmet 1 is subjected to an oblique impact K. The impact force K gives rise to both a tangential force $K_T$ and a radial force $K_R$ against the protective helmet 1. In this particular context, only the helmet-rotating tangential force $K_T$ and its effect are of interest.

As can be seen, the force K gives rise to a displacement 12 of the outer shell 2 relative to the inner shell 3, the connecting members 5 being deformed. A reduction in the torsional force transmitted to the skull 10 of roughly 25% can be obtained with such an arrangement. This is a result of the sliding motion between the inner shell 3 and the outer shell 2 reducing the amount of energy which is transferred into radial acceleration.

Sliding motion can also occur in the circumferential direction of the protective helmet 1, although this is not depicted. This can be as a consequence of circumferential angular rotation between the outer shell 2 and the inner shell 3 (i.e. during an impact the outer shell 2 can be rotated by a circumferential angle relative to the inner shell 3).

Figure 3A:
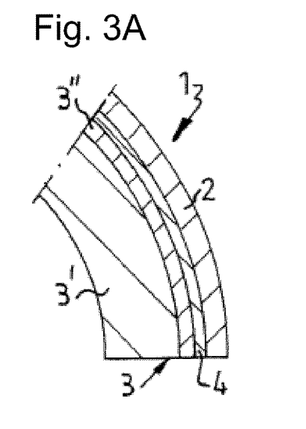
FIGS. 3A, 3B & 3C show variations of the structure of the helmet of FIG. 1.
Figure 3B:
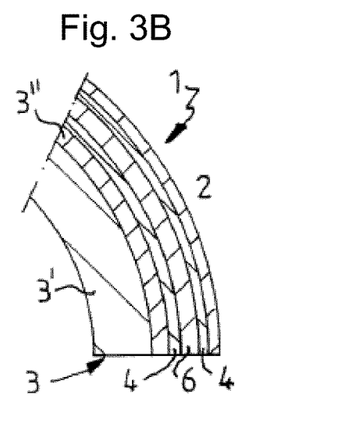

Other arrangements of the protective helmet 1 are also possible. A few possible variants are shown in FIG. 3. In FIG. 3*a*, the inner shell 3 is constructed from a relatively thin outer layer 3" and a relatively thick inner layer 3'. The outer layer 3" is preferably harder than the inner layer 3', to help facilitate the sliding with respect to outer shell 2. In FIG. 3*b*, the inner shell 3 is constructed in the same manner as in FIG. 3*a*. In this case, however, there are two sliding layers 4, between which there is an intermediate shell 6. The two sliding layers 4 can, if so desired, be embodied differently and made of different materials. One possibility, for example, is to have lower friction in the outer sliding layer than in the inner.

Figure 3C:
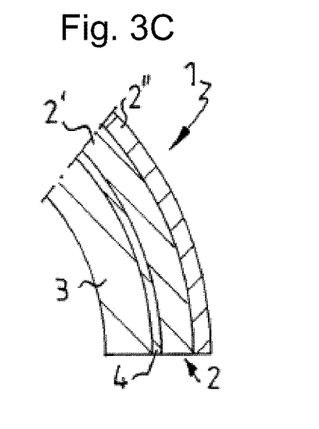

In FIG. 3*c*, the outer shell 2 is embodied differently to previously. In this case, a harder outer layer 2" covers a softer inner layer 2'. The inner layer 2' may, for example, be the same material as the inner shell 3.

Figure 4:
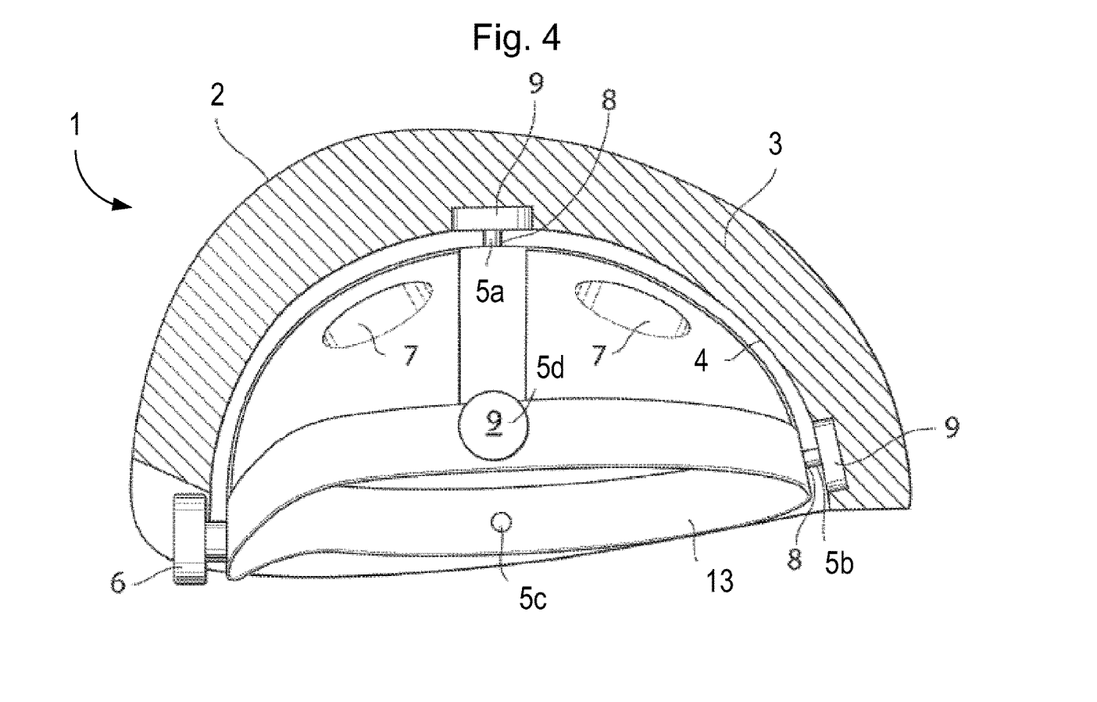
FIG. 4 is a schematic drawing of a another protective helmet.

FIG. 4 depicts a second helmet 1 of the sort discussed in WO 2011/139224, which is also intended for providing protection against oblique impacts. This type of helmet could also be any of the types of helmet discussed above.

In FIG. 4, helmet 1 comprises an energy absorbing layer 3, similar to the inner shell 3 of the helmet of FIG. 1. The outer surface of the energy absorbing layer 3 may be provided from the same material as the energy absorbing layer 3 (i.e. there may be no additional outer shell), or the outer surface could be a rigid shell 2 (see FIG. 5) equivalent to the outer shell 2 of the helmet shown in FIG. 1. In that case, the rigid shell 2 may be made from a different material than the energy absorbing layer 3. The helmet 1 of FIG. 4 has a plurality of vents 7, which are optional, extending through both the energy absorbing layer 3 and the outer shell 2, thereby allowing airflow through the helmet 1.

An attachment device 13 is provided, for attachment of the helmet 1 to a wearer's head. As previously discussed, this may be desirable when energy absorbing layer 3 and rigid shell 2 cannot be adjusted in size, as it allows for the different size heads to be accommodated by adjusting the size of the attachment device 13. The attachment device 13 could be made of an elastic or semi-elastic polymer material, such as PC, ABS, PVC or PTFE, or a natural fibre material such as cotton cloth. For example, a cap of textile or a net could form the attachment device 13.

Although the attachment device 13 is shown as comprising a headband portion with further strap portions extending from the front, back, left and right sides, the particular configuration of the attachment device 13 can vary according to the configuration of the helmet. In some cases the attachment device may be more like a continuous (shaped) sheet, perhaps with holes or gaps, e.g. corresponding to the positions of vents 7, to allow air-flow through the helmet.

FIG. 4 also depicts an optional adjustment device 6 for adjusting the diameter of the head band of the attachment device 13 for the particular wearer. In other arrangements, the head band could be an elastic head band in which case the adjustment device 6 could be excluded.

A sliding facilitator 4 is provided radially inwards of the energy absorbing layer 3. The sliding facilitator 4 is adapted to slide against the energy absorbing layer or against the attachment device 13 that is provided for attaching the helmet to a wearer's head.

The sliding facilitator 4 is provided to assist sliding of the energy absorbing layer 3 in relation to an attachment device 13, in the same manner as discussed above. The sliding facilitator 4 may be a material having a low coefficient of friction, or may be coated with such a material.

As such, in the FIG. 4 helmet, the sliding facilitator may be provided on or integrated with the innermost sided of the energy absorbing layer 3, facing the attachment device 13.

However, it is equally conceivable that the sliding facilitator 4 may be provided on or integrated with the outer surface of the attachment device 13, for the same purpose of providing slidability between the energy absorbing layer 3 and the attachment device 13. That is, in particular arrangements, the attachment device 13 itself can be adapted to act as a sliding facilitator 5 and may comprise a low friction material.

In other words, the sliding facilitator 4 is provided radially inwards of the energy absorbing layer 3. The sliding facilitator can also be provided radially outwards of the attachment device 13.

When the attachment device 13 is formed as a cap or net (as discussed above), sliding facilitators 4 may be provided as patches of low friction material.

The low friction material may be a waxy polymer, such as PTFE, ABS, PVC, PC, Nylon, PFA, EEP, PE and UHM-WPE, or a powder material which could be infused with a lubricant. The low friction material could be a fabric material. As discussed, this low friction material could be applied to either one, or both of the sliding facilitator and the energy absorbing layer The attachment device 13 can be fixed to the energy absorbing layer 3 and/or the outer shell 2 by means of fixing members 5, such as the four fixing members 5*a*, 5*b*, 5*c* and 5*d* in FIG. 4. These may be adapted to absorb energy by deforming in an elastic, semi-elastic or plastic way. However, this is not essential. Further, even where this feature is present, the amount of energy absorbed is usually minimal in comparison to the energy absorbed by the energy absorbing layer 3 during an impact.

According to the embodiment shown in FIG. 4 the four fixing members 5*a*, 5*b*, 5*c* and 5*d* are suspension members 5*a*, 5*b*, 5*c*, 5*d*, having first and second portions 8, 9, wherein the first portions 8 of the suspension members 5*a*, 5*b*, 5*c*, 5*d* are adapted to be fixed to the attachment device 13, and the second portions 9 of the suspension members 5a, 5b, 5c, 5d are adapted to be fixed to the energy absorbing layer 3.

Figure 5:
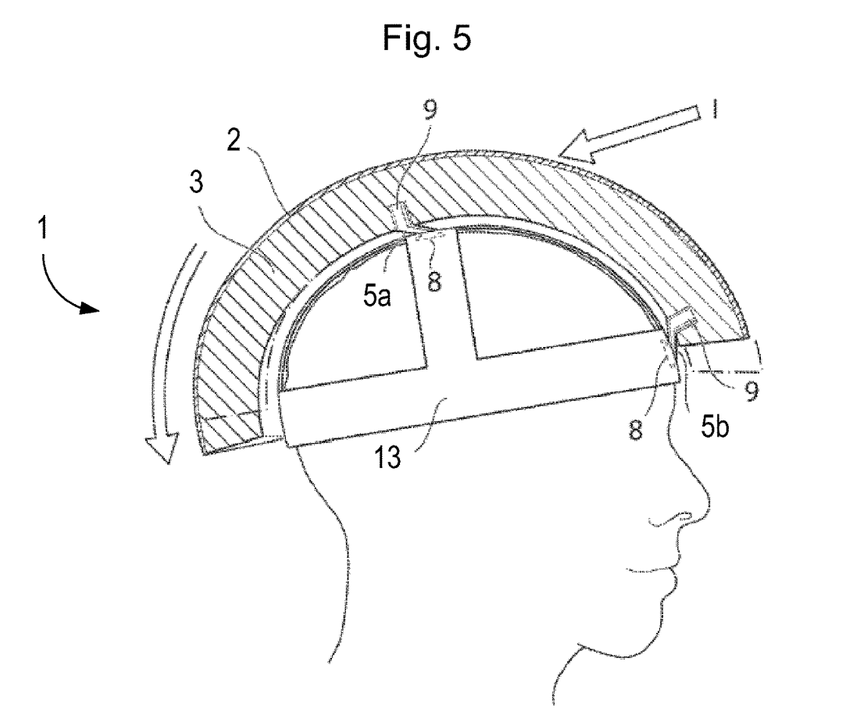
FIG. 5 depicts an alternative way of connecting the attachment device of the helmet of FIG. 4.

FIG. 5 shows an embodiment of a helmet similar to the helmet in FIG. 4, when placed on a wearers' head. The helmet 1 of FIG. 5 comprises a hard outer shell 2 made from a different material than the energy absorbing layer 3. In contrast to FIG. 4, in FIG. 5 the attachment device 13 is fixed to the energy absorbing layer 3 by means of two fixing members 5a, 5b, which are adapted to absorb energy and forces elastically, semi-elastically or plastically.

A frontal oblique impact I creating a rotational force to the helmet is shown in FIG. 5. The oblique impact I causes the energy absorbing layer 3 to slide in relation to the attachment device 13. The attachment device 13 is fixed to the energy absorbing layer 3 by means of the fixing members 5a, 5b. Although only two such fixing members are shown, for the sake of clarity, in practice many such fixing members may be present. The fixing members 5 can absorb the rotational forces by deforming elastically or semi-elastically. In other arrangements, the deformation may be plastic, even resulting in the severing of one or more of the fixing members 5. In the case of plastic deformation, at least the fixing members 5 will need to be replaced after an impact. In some case a combination of plastic and elastic deformation in the fixing members 5 may occur, i.e. some fixing members 5 rupture, absorbing energy plastically, whilst other fixing members deform and absorb forces elastically.

In general, in the helmets of FIG. 4 and FIG. 5, during an impact the energy absorbing layer 3 acts as an impact absorber by compressing, in the same way as the inner shell of the FIG. 1 helmet. If an outer shell 2 is used, it will help spread out the impact energy over the energy absorbing layer 3. The sliding facilitator 4 will also allow sliding between the attachment device and the energy absorbing layer. This allows for a controlled way to dissipate energy that would otherwise be transmitted as rotational energy to the brain. The energy can be dissipated by friction heat, energy absorbing layer deformation or deformation or displacement of the fixing members. The reduced energy transmission results in reduced rotational acceleration affecting the brain, thus reducing the rotation of the brain within the skull. The risk of rotational injuries including MTBI and STBI such as subdural haematomas, SDH, blood vessel rapturing, concussions and DAI is thereby reduced.

Connectors of the present invention for connecting two parts of an apparatus are described below. It should be appreciated that these connectors may be used in a variety of contexts and are not be limited to use within helmets. In the context of helmets, the connectors of the present invention may, in particular, be used in place of the previously known connecting members and/or fixing members of the arrangements discussed above.

Figure 6:
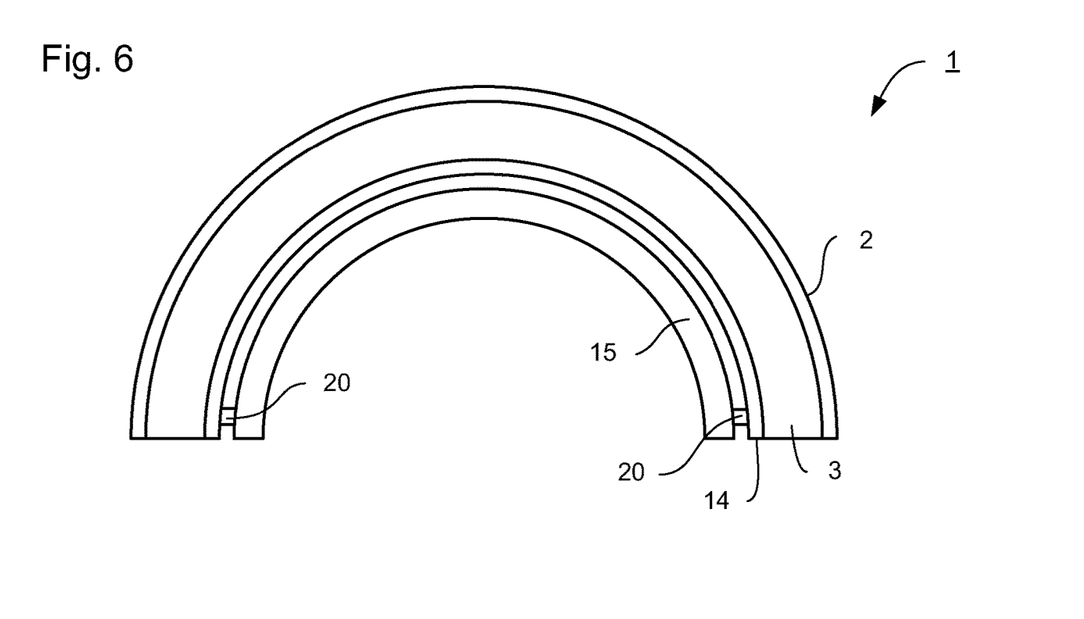
FIG. 6 depicts, in cross-section, a helmet according to an embodiment of the present invention.

In an embodiment of the invention, the connector may be used with a helmet 1 of the type shown in FIG. 6. The helmet shown in FIG. 6 has a similar configuration to that discussed above in respect of FIGS. 4 and 5. In particular, the helmet has a relatively hard outer shell 2 and an energy absorbing layer 3. A head attachment device is provided in the form of a helmet liner 15. The liner 15 may include comfort padding as discussed above. In general, the liner 15 and/or any comfort padding may not absorb a significant proportion of the energy of an impact in comparison with the energy absorbed by the energy absorbing layer 3.

The liner 15 may be removable. This may enable the liner to be cleaned and/or may enable the provision of liners that are modified to fit a specific wearer.

Between the liner 15 and the energy absorbing layer 3, there is provided an inner shell 14 formed from a relatively hard material, namely a material that is harder than the energy absorbing layer 3. The inner shell 14 may be moulded to the energy absorbing layer 3 and may be made from any of the materials discussed above in connection with the formation of the outer shell 2.

In the arrangement of FIG. 6, a low friction interface is provided between the inner shell 14 and the liner 15. This may be implemented by the appropriate selection of at least one of the material used to form the outer surface of the liner 15 or the material used to form the inner shell 14. Alternatively or additionally, a low friction coating may be applied to at least one of the opposing surfaces of the inner shell 14 and the liner 15. Alternatively or additionally, a lubricant may be applied to at least one of the opposing surfaces of the inner shell 14 and the liner 15.

As shown, the liner 15 may be connected to the remainder of the helmet 1 by way of one or more connectors 20 of the present invention, discussed in further detail below. Selection of the location of the connectors 20 and the number of connectors 20 to use may depend upon the configuration of the remainder of the helmet. Accordingly, the present invention is not limited to the configuration depicted in FIG. 6.

In an arrangement such as shown in FIG. 6, at least one connector 20 may be connected to the inner shell 14. Alternatively or additionally, one or more of the connectors 20 may be connected to another part of the remainder of the helmet 1, such as the energy absorbing layer 3 and/or the outer shell 2. The connectors 20 may also be connected to two or more parts of the remainder of the helmet 1.

Figure 7:
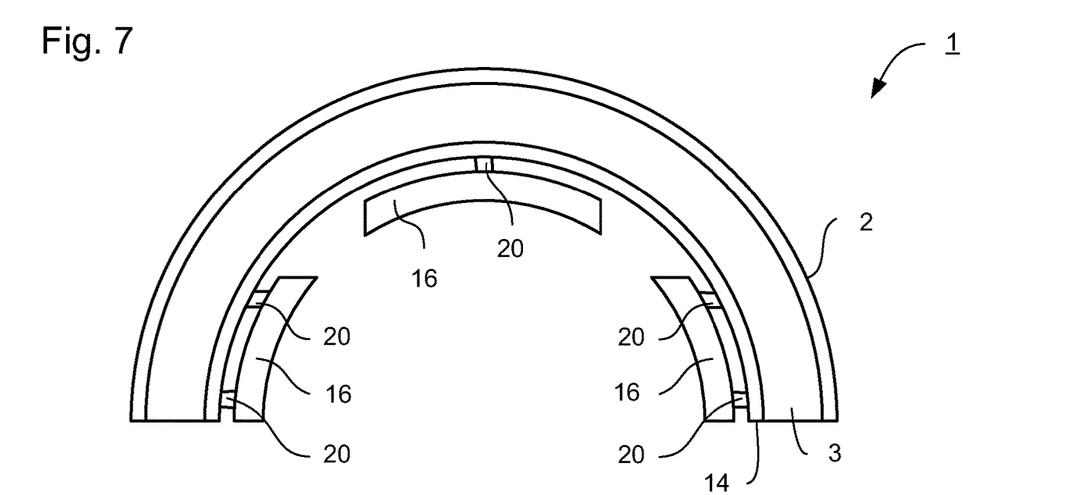
FIG. 7 depicts, in cross section, a helmet according to an embodiment of the present invention.

FIG. 7 depicts a further alternative arrangement of a helmet 1 using the connectors 20 of the present invention. As shown, the helmet 1 of this arrangement includes a plurality of independent sections of comfort padding 16. Each section of comfort padding 16 may be connected to the remainder of the helmet by one or more connectors 20 according to the present invention.

The sections of comfort padding 16 may have a sliding interface provided between the sections of comfort padding 15 and the remainder of the helmet 1. In such an arrangement, the sections of comfort padding 16 may provide a similar function to that of the liner 15 of the arrangement shown in FIG. 6. The options discussed above for provision of a sliding interface between a liner and a helmet also apply to the sliding interface between the sections of comfort padding and the helmet.

It should also be appreciated that the arrangement of FIG. 7, namely the provision of a plurality of independently mounted sections of comfort padding 16 provided with a sliding interface between the sections of comfort padding 16 and the remainder of the helmet may be combined with any form of helmet, including those such as depicted in FIGS. 1 to 5 that also have a sliding interface provided between two other parts of the helmet.

Connectors 20 according to the present invention will now be described. For convenience, the connectors 20 will be described in the context of a connector for connecting a liner 15 to the remainder of a helmet 1 as depicted in FIG. 6. However, it should be appreciated that the connector 20 of the present invention may be used for connecting any two parts of an apparatus together. Furthermore, where below the connector 20 is described as having a first component connected to a first part of an apparatus, such as a helmet liner 15, and a second component connected to a second part of an apparatus, such as the remainder of the helmet 1, it should be appreciated that, with suitable modifications, this may be reversed.

Figure 8:
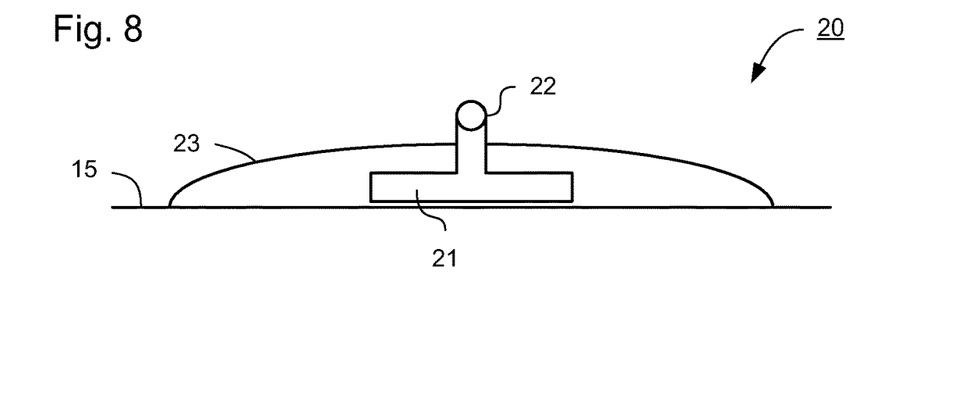
FIG. 8 depicts, in cross-section, a connector according to an embodiment of the present invention.

FIG. 8 depicts, in cross-section, an embodiment of a connector 20 according to the present invention that may be used to connect first and second parts of an apparatus, such as a helmet. In particular it may be configured to connect a liner 15 to the remainder of a helmet. In the arrangement depicted in FIG. 8, the connector 20 includes a sliding plate 21 and an anchor point 22 provided on one side of the plate 21.

The anchor point 22 in the arrangement depicted in FIG. 8 is in the form of a protrusion that may be connected to the first part. For example, the protrusion 22 may be connected to the remainder of a helmet by way of a snap-fit connection or a magnetic connector. Other forms of detachable connection may also be used. Alternatively, the protrusion 22 may be non-detachably connected to the first part of the apparatus, for example by means of an adhesive.

The anchor point 22 may be configured such that it can be connected to the first part in a manner that prevents translational movement of the anchor point 22 relative to the first part. However, it may be configured such that the anchor point 22, and therefore the plate 21, can rotate about one or more axes of rotation relative to the first part.

The sliding plate 21 may be formed from a sufficiently stiff material that it substantially retains its shape during expected use of the apparatus. In the context of a helmet, this may include normal handling of the helmet and wearing the helmet under normal conditions. It may also include conditions including an impact on the helmet for which the helmet is designed with the expectation that the impact would be survivable for the wearer of the helmet.

In the arrangement depicted in FIG. 8, the sliding plate 21 is provided adjacent to the surface of the second part, such as the liner 15, such that the plate 21 may slide on the surface of the liner 15.

Deformable material is provided that at least partially covers the side of the plate 21 on which the anchor point 22 is provided. The peripheral region of the deformable material 23 is connected to the second part, namely the liner 15. In the arrangement depicted in FIG. 8, the inner region of the deformable material 23 is connected to the anchor point 22.

In such a configuration, the deformable material 23 provides a connection between the plate 21 and its anchor point 22 and the second part of the apparatus, namely the liner 15. It may also define a natural resting position of the plate 21 relative to the second part of the apparatus. However, by deformation of the deformable material 23, for example stretching of one side of the deformable material, the plate 21 is permitted to slide relative to the second part of the apparatus, such as the liner 15. In doing so, the first part of the apparatus, such as the remainder of the helmet, which may be connected to the anchor point 22, may slide relative to the second part of the apparatus, such as the liner 15.

A connector 20 of the present invention may be configured to permit a desired range of movement of the anchor point 22, and therefore the first part of the apparatus, relative to the second part of the apparatus. For example, a connector 20 for use within a helmet may be configured to enable movement of the anchor point 22 relative to the second part of the apparatus of approximately 5 mm or more in any direction within a plane parallel to the major surface of the plate 21.

When viewed in plan view, the anchor point 22 may be arranged substantially at the centre of the plate 21. However, the present invention is not limited to a particular configuration. When viewed in plan view, any convenient shape of the plate 21 may be used, for example substantially rectangular, substantially square, substantially circular or substantially elliptical. In the case of a shape having corners, the corners may be rounded in order to minimise the risk of the plate getting caught on another part of the connector or another component.

The deformable material 23 may be a sheet-like material. In an arrangement, the material may deform substantially elastically for the required range of movement of the plate 21 relative to the second part. For example, the deformable material may be formed from at least one of an elasticated fabric, an elasticated cloth, an elasticated textile and a sheet of elastomeric material.

The deformable material 23 may be connected to the second part, such as the liner 15, in a manner that prevents translational movement of the section of the deformable material that is connected to the second part, relative to the second part. For example, in the case of a deformable material such as that discussed above being connected to a helmet liner 15, the deformable material 23 may be stitched to the liner 15. Alternatively or additionally, where appropriate, the deformable material 23 may be connected to the second part by, for example, an adhesive. Alternatively or additionally, as in further embodiments discussed below, the deformable material may be connected to the second part indirectly, namely by way of one or more additional components.

In order to ensure that the sliding plate 21 can slide relative to the second part, such as the liner 15, a low friction interface may be provided between the opposing surfaces of the plate 21 and the second part, namely the liner 15.

In this context, a low friction interface may be configured such that sliding contact is still possible even under the loading that may be expected in use. In the context of a helmet, for example, it may be desirable for sliding to be maintained in the event of an impact that this expected to be survivable for the wearer of a helmet. This may be provided, for example, by the provision of an interface between the two surfaces at which the coefficient of friction is between 0.001 and 0.3 and/or below 0.15.

In the present invention, a low friction interface may be implemented by at least one of using at least one low friction material for the construction of the element forming at least one of the opposing surfaces, applying a low friction coating to at least one of the opposing surfaces, applying a lubricant to at least one of the opposing surfaces, and providing an unsecured additional layer of material between the opposing surfaces that has at least one low friction surface.

A plate used in the connector of the present invention may be made from a variety of different materials. In an example, a plate may be made from polycarbonate (PC), polyvinyl-chloride (PVC), acrylonitrile butadiene styrene (ABS), polypropylene (PP), Nylon or another plastic. The plates may optionally have a thickness in the range of from approximately 0.2 mm to approximately 1.5 mm, for example approximately 0.7 mm thick.

Figure 9:
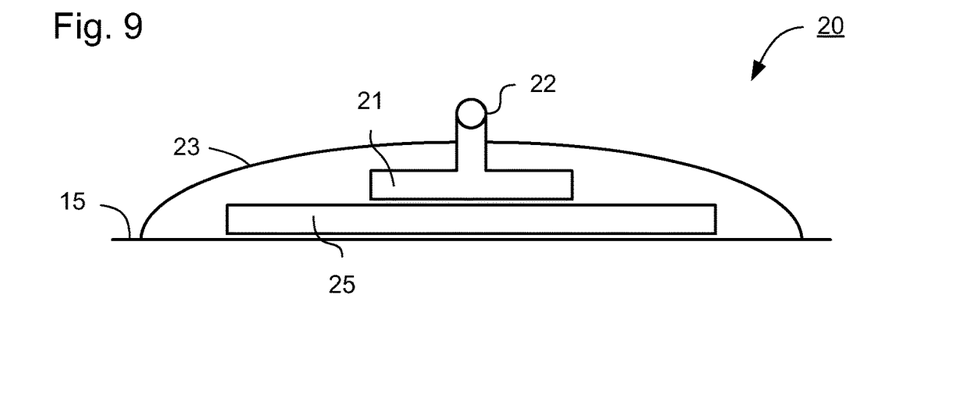
FIG. 9 depicts, in cross-section, a connector according to an embodiment of the present invention.

FIG. 9 depicts, in cross-section, an alternative arrangement of a connector 20 according to the present invention. Much of the configuration of the arrangement depicted in FIG. 9 corresponds to that of the arrangement depicted in FIG. 8 and, for conciseness, only the differences are discussed. In the arrangement depicted in FIG. 9, a second plate 25 is provided between the first plate 21 and the second part, such as the liner 15. As with the first plate 21, the second plate may be configured such that it is expected to substantially maintain its shape during the expected use of the connector 20.

In use, the sliding plate 21 may slide relative to the second plate 25. The second plate 25 may also slide relative to the second part, such as the liner 15. Accordingly, a low friction interface such as discussed above may be provided between at least one of the opposing surfaces of the first plate 21 and the second plate 25 and between the opposing surfaces of the second plate 25 and the second part, such as the liner 15.

Figures 10, 11:
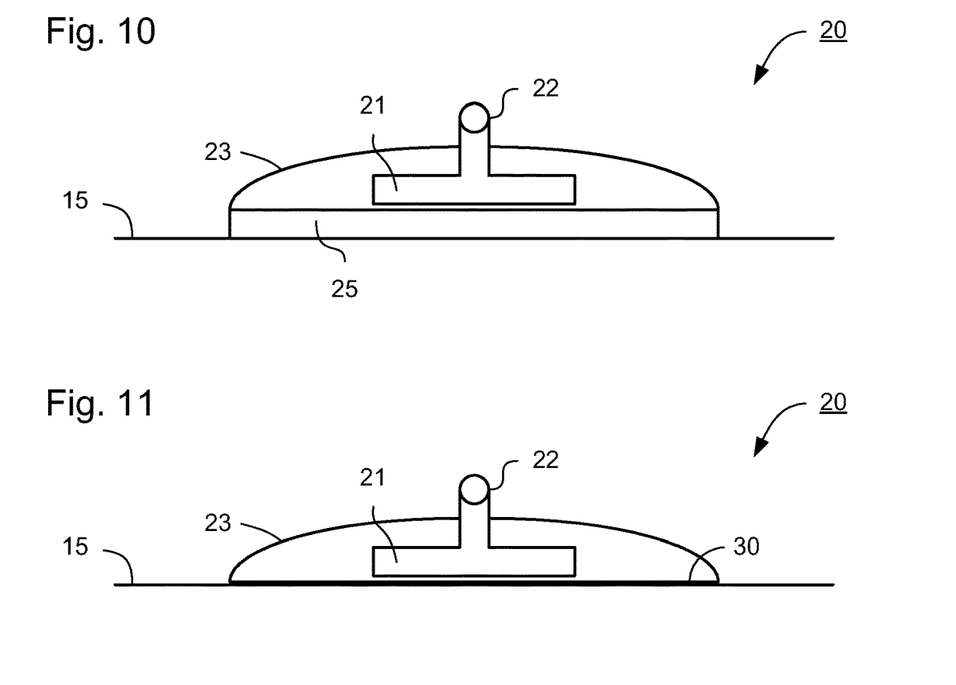
FIG. 10 depicts, in cross-section, a connector according to an embodiment of the present invention.
FIG. 11 depicts, in cross-section, a connector according to an embodiment of the present invention.

FIG. 10 depicts, in cross-section, a further variation of the connector 20 of the present invention. This arrangement differs from that depicted in FIG. 9 in that the peripheral region of the deformable material 23 is connected to the second plate 25 rather than directly to the second part. In this case, the second plate 25 may be connected to the second part, such as the liner 15. In such an arrangement, the connector 20 may easily be formed separate from the first and second parts of the apparatus to be connected by the connector 20. The connector may subsequently be connected to the first and second parts of the apparatus when required.

FIG. 11 depicts, in cross-section, a further variation of a connector 20 according to the present invention. In this arrangement, which is similar to the arrangement depicted in FIG. 10, in place of a second plate 25, the connector may include a layer of flexible material 30. The flexible material may be at least one of a fabric, cloth, textile or non-woven material.

In a corresponding fashion to the arrangement depicted in FIG. 10, the deformable material 23 may be connected to the layer of flexible material 30 in order to form a connector 20 that can be formed separate from the first and second parts of the apparatus and subsequently connected to the first and second parts of the apparatus that are to be connected by the connector 20.

In such an arrangement, the connector 20 may be connected to the second part of the apparatus, such as a liner 15 of a helmet, by connecting the layer of flexible material 30 to the second part of the apparatus. Alternatively or additionally, as shown in FIG. 11, the deformable material 23 and the layer of flexible material 30 may be connected to the second part at the point at which they are connected to each other, for example by stitching and/or adhesive.

Figure 12:
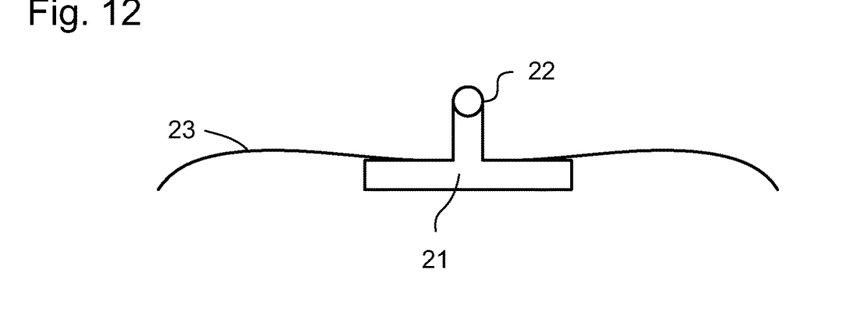
FIG. 12 depicts, in cross-section, a part of a connector according to a variation of the present invention.

FIG. 12 depicts, in cross-section, a part of a connector 20 that may be a variant of any of the arrangements discussed above. In particular, as shown, the deformable material 23 may be connected to the sliding plate 21 instead of to the anchor point 22. In a further variation, the deformable material 23 may be connected to both the plate 21 and the anchor point 22.

Figure 13:
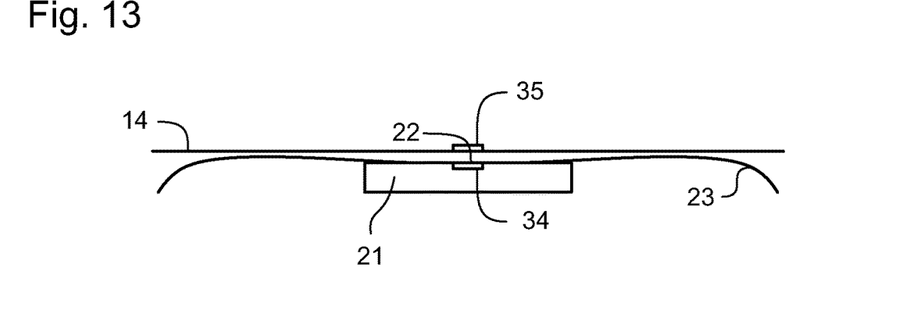
FIG. 13 depicts, in cross-section, a part of a connector according to a variation of the present invention.
Figure 14:
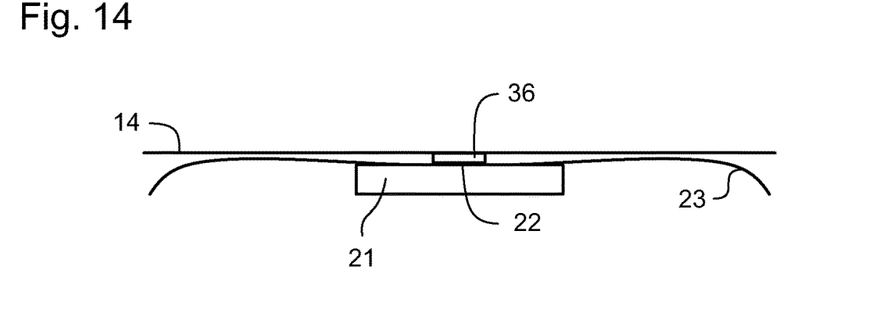
FIG. 14 depicts, in cross-section, a part of a connector according to a variation of the present invention.

FIGS. 13 and 14 depict, in cross-section, a part of a connector 20 according to the present invention having further variations, respectively, of the configuration that may be applied to any of the arrangements discussed above. In particular, as shown, the anchor point 22 need not be formed as a protrusion extending from one side of the plate 21. As shown, the anchor point 22 may be flush with the surface of the plate 21 on which it is located.

In the case of the arrangement shown in FIG. 13, the anchor point 22 may include an insert 34 within the plate 21 that is configured to operate in conjunction with an insert 35 in the first part, such as the inner shell 14 of the helmet. In particular, at least one of the inserts 34, 35 may be magnetic to provide a magnetic connection between the inserts 34, 35 and therefore between the anchor point 22 and the first part, such as the inner shell 14 of the helmet.

In the arrangement depicted in FIG. 14, adhesive 36 may be provided to connect the anchor point 22 of the plate 21 to the first part, such as the inner shell 14 of a helmet.

Figure 15:
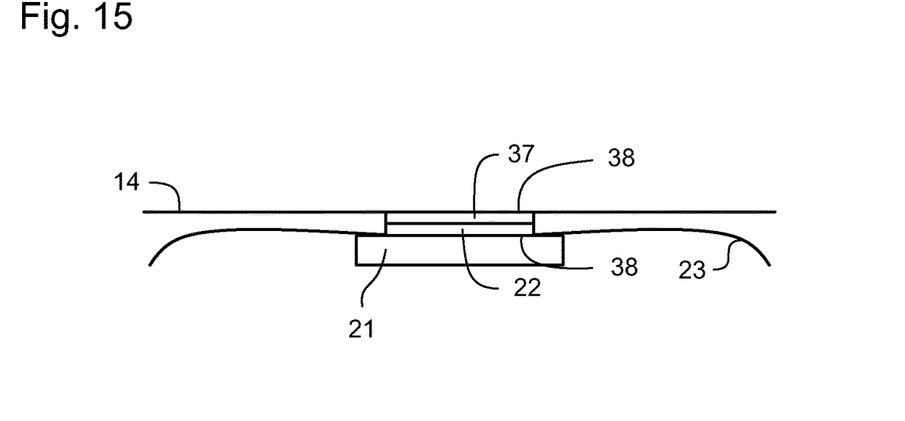
FIG. 15 depicts, in cross-section, a part of a connector according to a variation of the present invention.

FIG. 15 depicts, in cross-section, a part of a connector 20 having a further variation of the configuration that may be applied to any of the arrangements discussed above. As with the arrangement shown in FIG. 13 or 14, the anchor point 22 may be flush with the surface of the plate 21 on which it is located. In addition, a hook and loop type connection may be provided between the anchor point 22 and the first part of the apparatus to which it is to connect, such as the inner shell 14 of the helmet.

In an arrangement, the anchor point 22 may comprise a section of one of hook and loop material and a section of the other of hook and loop material 37 may be secured to the second part to which the connector 20 is to connect, such as the inner shell 14 of the helmet.

The sections of hook and loop material 22, 37 may, as depicted in FIG. 15, be connected to the deformable material 23 and the first part to which the connector 20 is to connect, such as the inner shell 14 of the helmet, by an adhesive 38. Alternatively, at least one of the deformable material 23 and the first part, such as the inner shell 14 of the helmet, may itself be formed from a material that functions as one half of a hook and loop fastening.

Figure 16:
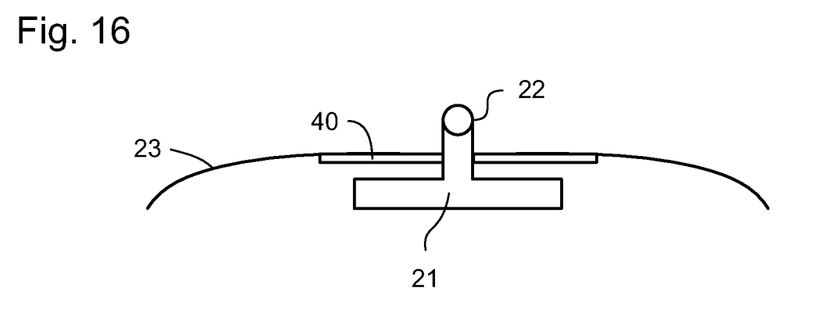
FIG. 16 depicts, in cross-section, a part of a connector according to a variation of the present invention.
Figure 17:
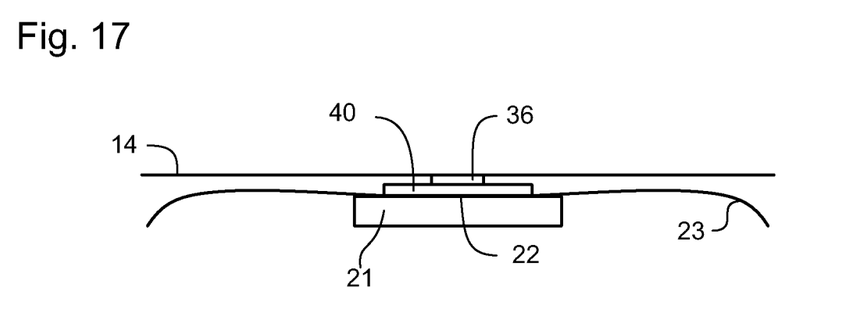
FIG. 17 depicts, in cross-section, a part of a connector according to a variation of the present invention.

FIGS. 16 and 17 depict, in cross-section, a part of a connector 20 according to the present invention having further variations, respectively, of the configuration that may be applied to any of the arrangements discussed above. FIG. 16 depicts an example in which the anchor point 22 is formed as a protrusion and FIG. 17 depicts and example of an arrangement in which the anchor point 22 is flush with the surface of the sliding plate 21, particularly an example in which adhesive 36 is used to secure the anchor point 22 to the first part of the apparatus. As shown, in the variants depicted in FIGS. 16 and 17, at the point in which the deformable material 23 is connected to the anchor point 22, the deformable material 23 may be reinforced by a section of reinforcing material 40. The reinforcing material 40 may be stiffer than the deformable material 23. The anchor point 22 may be connected to the reinforcing material 40.

Figure 18:
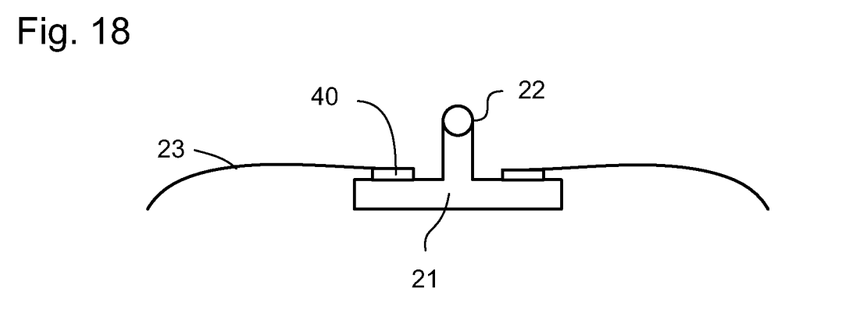
FIG. 18 depicts, in cross-section, a part of a connector according to a variation of the presentation invention.

Similarly, as shown in cross-section in FIG. 18, in arrangements in which the deformable material 23 is connected to the plate 21 rather than to the anchor point 22, a section of reinforcing material 40 may be provided at the point at which the deformable material 23 is connected to the plate 21.

The invention claimed is:

1. A connector for connecting first and second parts of a helmet, comprising:
   a sliding plate;
   an anchor point on a first side of the sliding plate, configured to be connected to the first part; and
   a deformable material, configured to at least partially cover the first side of the sliding plate;
   wherein a peripheral region of the deformable material is configured to be connected to the second part and an inner region of the deformable material is connected to at least one of the plate and the anchor point;
   the connector further comprising a layer of material that is located on a second side of the sliding plate opposite to the first side of the sliding plate;
   wherein a low friction interface is provided between the second side of the sliding plate and the layer of material.

2. A connector according to claim 1, wherein the peripheral region of the deformable material is configured to be directly connected to the second part of the helmet.

3. A connector according to claim 1, wherein the peripheral region of the deformable material is connected to the layer of material on the second side of the plate from the anchor point and the layer of material is configured to be connected to the second part of the helmet.

4. A connector according to claim 1, wherein the-layer of material is a second sliding plate.

5. A connector according to claim 1, wherein the-layer of material is a layer of flexible material.

6. A connector according to claim 5, wherein the layer of flexible material is at least one of a fabric, cloth, textile or non-woven material.

7. A connector according to claim 1, wherein the low friction interface is implemented by at least one of using at least one low friction material for construction of the sliding plate or the layer of material, applying a low friction coating to at least one of the second side of the plate and the layer of material, applying a lubricant to at least one of the second side of the plate and the layer of material, and providing an unsecured additional layer of material between the second side of the plate and the layer of material that has at least one low friction surface.

8. A connector according to claim 1, wherein the deformable material is a sheet material that may deform substantially elastically.

9. A connector according to claim 8, wherein the deformable material is at least one of an elasticated fabric, cloth or textile and a sheet of elastomeric material.

10. A connector according to claim 1, wherein the inner region of the deformable material is reinforced by a section of reinforcing material that is stiffer than the deformable material.

11. A connector according to claim 10, wherein the anchor point is connected to the reinforcing material.

12. A connector according to claim 1, wherein the anchor point comprises a protrusion that extends from the surface of the plate.

13. A connector according to claim 1, wherein the anchor point is configured to be detachably connected to the first part of the helmet.

14. A connector according to claim 13, wherein the anchor point is configured to be connected to the first part of the helmet by at least one of a hook and loop connection, a snap-fit connection and a magnetic connector.

15. A connector according to claim 1, wherein the anchor point is connected to the first part in a manner that prevents translational movement of the anchor point relative to the first part.

16. A connector according to claim 1, wherein the deformable material is connected to the second part in a manner that prevents translational movement of the section of deformable material that is connected to the second part relative to the second part.

17. A liner for a helmet, comprising at least one connector according to claim 1.

18. A liner for a helmet according to claim 17, wherein the anchor point of the at least one connector is configured to be connected to the helmet and the peripheral region of the deformable material is connected to a main body of the liner.

19. A liner for a helmet according to claim 17, wherein the liner comprises comfort padding.

20. A helmet, comprising a liner according to claim 17.

21. A helmet according to claim 20, wherein the liner is removable from the helmet.

22. A helmet according to claim 20, wherein the anchor point of the at least one connector is connected to at least one of an outer shell of the helmet, an energy absorbing layer of material in the helmet and a layer of material provided more inwardly than the energy absorbing material of the helmet.

23. A helmet according to claim 20, comprising in turn, an outer shell, one or more layers of energy absorbing material, an inner shell, and the liner.

24. A helmet according to claim 23, wherein a low friction interface is provided between the inner shell and the liner.

25. A helmet according to claim 24, wherein the low friction interface is implemented by at least one of using at least one low friction material for construction of the inner shell and the liner, applying a low friction coating to at least one of a surface of the inner shell and a surface of the liner opposing the surface of the inner shell, and applying a lubricant to at least one of the surface of the inner shell and the surface of the liner opposing the surface of the inner shell.

26. A helmet, comprising a plurality of independent sections of comfort padding, each mounted to the helmet by at least one connector according to claim 1.

27. A helmet according to claim 26, comprising in turn, an outer shell formed from a relatively hard material, one or more layers of energy absorbing material, an inner shell formed from a relatively hard material, and the plurality of sections of comfort padding.

28. A helmet according to claim 27, wherein a low friction interface is provided between the inner shell and the plurality of sections of comfort padding.

29. A helmet according to claim 28, wherein the low friction interface is implemented by at least one of using at least one low friction material for construction of the inner shell and the plurality of sections of comfort padding, applying a low friction coating to at least one of a surface of the inner shell and a surface of the plurality of sections of comfort padding opposing the surface of the inner shell, and applying a lubricant to at least one of the surface of the inner shell and the surface of the plurality of sections of comfort padding opposing the surface of the inner shell.

30. A set of a plurality of sections of comfort padding for use within a helmet, wherein each section of comfort padding comprises at least one connector according to claim 1, wherein a peripheral region of the deformable material of each of the at least one connector is connected to the corresponding section of comfort padding.

* * * * *